(12) United States Patent
Chen et al.

(10) Patent No.: US 10,223,176 B1
(45) Date of Patent: Mar. 5, 2019

(54) EVENT HANDLER NODES FOR VISUAL SCRIPTING

(71) Applicant: Amazon Technologies, Inc., Reno, NV (US)

(72) Inventors: Jegan Chen, Carlsbad, CA (US); Charles Michael Hutchins Curran, Seattle, WA (US); Ross Alan Cameron Gardner, Irvine, CA (US); Derric McGarrah, Austin, TX (US); Bradley Rebh, Kenmore, WA (US); Carlin Michael Rogers, II, Trabuco Canyon, CA (US); Syed Suhaib Sarmad Barbero, Lake Forest, CA (US); Luis Rene Sempe Sosa, Irvine, CA (US); David Walker, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/783,672

(22) Filed: Oct. 13, 2017

(51) Int. Cl.
*G06F 8/30* (2018.01)
*G06F 9/54* (2006.01)
*G06F 8/41* (2018.01)

(52) U.S. Cl.
CPC ............. *G06F 9/542* (2013.01); *G06F 8/30* (2013.01); *G06F 8/41* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 6,268,852 | B1* | 7/2001 | Lindhorst | G06F 8/34 715/234 |
| 9,189,211 | B1* | 11/2015 | Nicholson | G06F 8/51 |
| 2002/0161462 | A1* | 10/2002 | Fay | A63F 13/10 700/94 |
| 2006/0167880 | A1* | 7/2006 | Meijer | G06F 8/30 |
| 2006/0174221 | A1* | 8/2006 | Kinsella | G06F 8/36 717/106 |
| 2007/0192818 | A1* | 8/2007 | Bourges-Sevenier | H04L 12/2803 725/132 |
| 2013/0219361 | A1* | 8/2013 | Fiebig | G06F 8/70 717/121 |
| 2013/0305218 | A1* | 11/2013 | Hirsch | G06F 8/30 717/106 |
| 2014/0040920 | A1* | 2/2014 | Wu | G06F 9/542 719/318 |

(Continued)

*Primary Examiner* — Isaac T Tecklu
(74) *Attorney, Agent, or Firm* — Hogan Lovells US LLP

(57) ABSTRACT

A visual scripting system can provide support for handling event-specific messages received through an event messaging system. The messaging system can provide event messages over one or more event buses that have a determined behavior context. An event node of a visual scripting system can enable a developer to specify event handlers to detect specific types of event notifications sent on a specified event bus, as well as specific actions to be taken in response to those event notifications, such as to send additional event messages, all of which comply with the behavior context. Once the event node is configured and properties and actions defined, the corresponding script can be generated by the visual scripting system, to be complied and executed as part of a user application.

20 Claims, 8 Drawing Sheets

(56) References Cited

U.S. PATENT DOCUMENTS

| | | | |
|---|---|---|---|
| 2014/0282453 A1* | 9/2014 | O'Rourke | G06F 8/41 |
| | | | 717/154 |
| 2014/0289701 A1* | 9/2014 | Hamlin | G06F 8/30 |
| | | | 717/113 |
| 2017/0083292 A1* | 3/2017 | McLaughlan | G06F 8/34 |
| 2018/0146034 A1* | 5/2018 | Lintner | H04L 67/1034 |

* cited by examiner

EVENT HANDLER NODES FOR VISUAL SCRIPTING

BACKGROUND

The widespread adoption of portable computing devices, such as smartphones and tablet computers, has resulted in a corresponding increase in the number of electronic games available to players. Many of these games offer realistic worlds and three-dimensional gameplay. The creation of these games can be complicated, however, and game developers often are unable to locate a sufficient number of skilled developers to support the vast array of gaming offerings. While there are various tools available that can assist the development of these games, the tools do not always provide the type of support needed, or only provide limited functionality.

BRIEF DESCRIPTION OF THE DRAWINGS

Various embodiments in accordance with the present disclosure will be described with reference to the drawings, in which.

DETAILED DESCRIPTION

Figure 1:
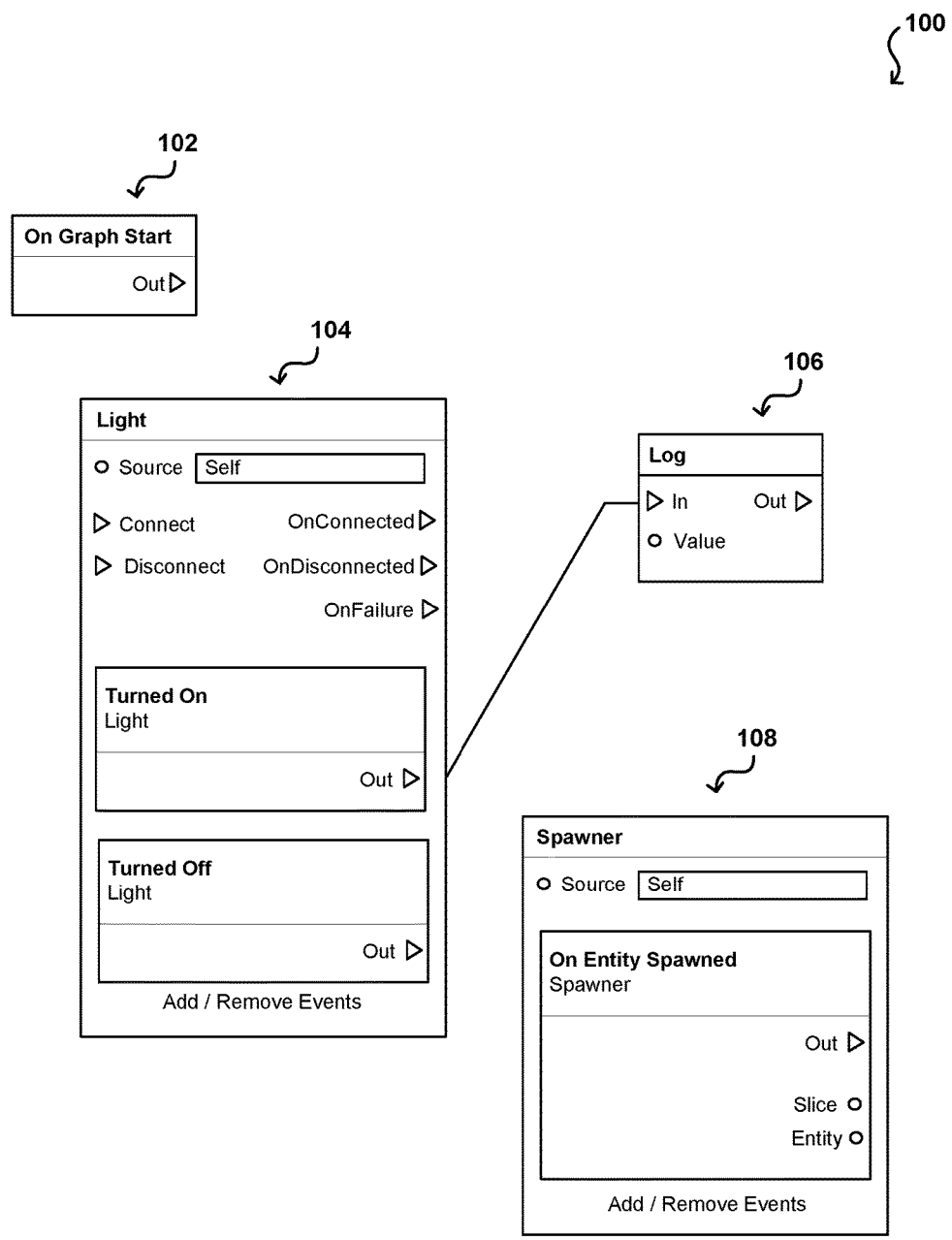
FIG. 1 illustrates example nodes that can be utilized with a visual scripting interface in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for development of applications, such as electronic gaming applications. In particular, various approaches provide for the support and management of event-specific messages received through an event messaging system. The system can provide event messages over one or more event streams, referred to herein as event buses, that comply with a determined behavior context and enable interfaces to be developed that can be used to send event messages and receive event notifications. An event bus can provide the appropriate interfaces to be used for sending event-based messages and allowing for event-driven programming as discussed herein. An event node of a visual scripting system can enable a developer to specify event handlers, also referred to as event listeners, to detect specific types of event notifications, as well as to provide event code to take specific actions in response to those event notifications, all of which comply with the behavior context. A developer can thus incorporate the event messages without needing to understand the complexity of the messaging system. Once the event node is configured and properties and actions defined, the corresponding script can be generated by the visual scripting system, which can then be complied and executed as part of an application or gaming session.

Various other functions can be implemented within the various embodiments as well as discussed and suggested elsewhere herein.

In various embodiments, a visual scripting language and/or interface can be used to provide for a simplified application or game development process. A visual scripting language in at least some embodiments is node based, wherein each object to be rendered in a scene, for example, can be rendered as a node in the interface. Nodes can also represent operations, events, variables, function calls, and the like. The nodes can have various properties set that determine the behavior of the objects in the game, and can be linked together for actions that may involve two or more objects. There can be a set of node types from which a developer can select, where each node type corresponds to a particular function. In some embodiments developers can create or download new node types, or modify the functionality of existing types. Such an approach provides for the ability to create gameplay without the need for manual scripting or compiling of code. In some embodiments, the interface allows for the extending of existing classes that can then the added and arranged in a node graph, allowing for the inclusion of custom logic and components, appropriate variables and event handlers, etc.

FIG. 1 illustrates an example set of nodes 100 that can be utilized through a visual scripting interface in accordance with various embodiments. Such an approach can utilize at least one event handler node, or "event node," that can interpret various event handlers, such as event handlers from a general purpose communication system, such as the EBus service provided by Amazon.com, Inc. in its Lumberyard game development platform. Such a communication system can dispatch notifications and receive requests, and can be configurable to support many different use cases. Components can use the communication system to perform actions such as to dispatch events or handle requests. In some embodiments the communication system can utilize components referred to as event buses, or simply buses. An event bus can function as an event-based message stream or communication channel in which messages from specific sources and/or specific types are transmitted according to a specified behavior profile. While "bus" is used to indicate a controlled communications channel, it should be understood that the bus is not a hardware bus as would be located on a motherboard or other computing hardware unless otherwise specifically stated. An event bus that dispatches events can be referred to as a notification bus, while an event bus that receives requests can be referred to as a request bus. A component can provide one or both types, or neither. A single bus class can be used for both bus types but with different configurations. Notification buses can dispatch events. The events are received by handlers, which implement at least one function to handle each supported type of event. Handlers can first connect to the bus, and the respective handler function can execute when the bus dispatches an event.

When setting up an event bus to dispatch events, a class can be defined that inherits traits from the bus, where this class can function as the interface for the notification bus. The properties can be used to define the behavior of the bus. Example properties can define, for example, the number of addresses the bus can contain, the number of handlers that can connect to each address, and the type of identifier to be used to address the bus, among other such options. A function can also be declared for each event to be dispatched by the notification bus. Handler classes can implement these functions to handle the events. A bus can be declared that implements the functions to handle the events, and the events can then be sent. The function used to send the event in some embodiments can depend upon the addresses to which the event is to be sent, whether to return a value, the order in which to call the handlers, and whether to queue the event, among other such options. To send an event to all handlers connected to the notification bus, a broadcast function can be utilized in some embodiments. To send events asynchronously, the event can be queued and then executed when the queue is flushed.

At least one handler can be configured to enable a handler class to handle events dispatched by a notification bus. The handler class can be defined with the appropriate derivations, such from the appropriate bus for a type of request. The bus interface can be implemented to define how the handler class should handle the events. For a tick bus example, a handler class could implement OnTick( ). Connect and disconnect actions from the bus can be performed at appropriate places within the handler class code.

Request buses can be configured to receive and handle requests, where one class can handle requests for a specific request bus. To set up a request bus, a class can be defined that inherits the appropriate bus traits, and that can function as the interface for requests made to the bus. The individual trait properties can be defined to manage the behavior of the bus, as may relate to the number of available addresses or the number of handlers that can connect to each address, among other such options. A function can be declared for each event for which the handler class will receive requests. These can be the functions that other classes will use to make requests of the handler class. A bus can also be declared that takes the class as a template parameter, and a handler can be implemented for the events described with respect to the handlers above.

Event buses can be beneficial for use in dispatching messages in at least some embodiments, as the buses provide an abstraction that minimizes the hard dependencies between systems, and allow for event-driven programming that eliminates polling patterns for more scalable and higher performing software. Event buses also can provide cleaner application code, enabling an application to safely dispatch messages without concern for how the messages are being handled. Event buses can provide concurrency, as events from various threads can be queued for safe execution on another thread or for distributed system applications. An event bus can provide predictability by being able to provide support for the ordering of handlers on a given bus, as debugging capability that leverages the ability to intercept messages for reporting, profiling, and introspection purposes, among others. Event buses can also be used in a number of different ways, such as for a direct global function call, for dispatch processing to multiple handlers, or to queue all calls where the bus functions as a command buffer. An event bus can also function as an addressable mailbox, able to support imperative or queued delivery, as well as automatic marshalling of a function call into a network message or other command buffer.

While event buses can be beneficial for these and other purposes, the need to know how to properly configure these buses, and incorporate them into various types of applications, can make it difficult for various users to utilize them to the extent that may be desired. Accordingly, approaches in accordance with various embodiments can provide the ability to utilize various event bus scripting nodes in a visual scripting system. An event bus scripting node, also referred to herein as an event node, can interpret event handlers from the event bus communication system, and can provide the ability to add any number of events via the single event node. Such an approach can make it easier and simpler to work with many different events from the same handler. Various embodiments also provide advanced controls for manual connection and disconnection to the event bus communication system. The event nodes can support an event-driven paradigm in exposing scripting functionality in, for example, a gaming engine such as a C++ engine. An event node can encompass the event handling capabilities of any corresponding event bus.

FIG. 1 illustrates various nodes 102, 104, 106, 108 that can be used to manage code and functionality in an application being developed, as may relate to a gaming application in some embodiments. In this example, a base node 102 may serve as the entry point to a level, stage, or other portion of the application represented by the node graph. An entry node 104 in this example corresponds to a lighting function. The event node 104 can be used to select the relevant source, as well as to provide for connect and disconnect actions. The event node can also make appropriate calls to other event nodes 106, 108 for specific actions, such as for a connection, disconnect, or failure action. In this example, there are also different calls made while the light function is active and not active. In this example, a log call is output to a log node 106 that causes a specified value to be logged for the active light function. In this example, another node 108 for a spawning function is tied to the same source, and able to call various other functions or nodes for specified actions. The light event node 104 can provide the ability to subscribe and listen for events, as well as to generate events for other nodes. For example, the light node 104 can listen for connect or disconnect actions, and in response can generate events to call to other nodes in the visual scripting system. For each detected event, at least one handler can be specified to handle or process that event, which in turn can involve generating one or more related events.

Figure 2:
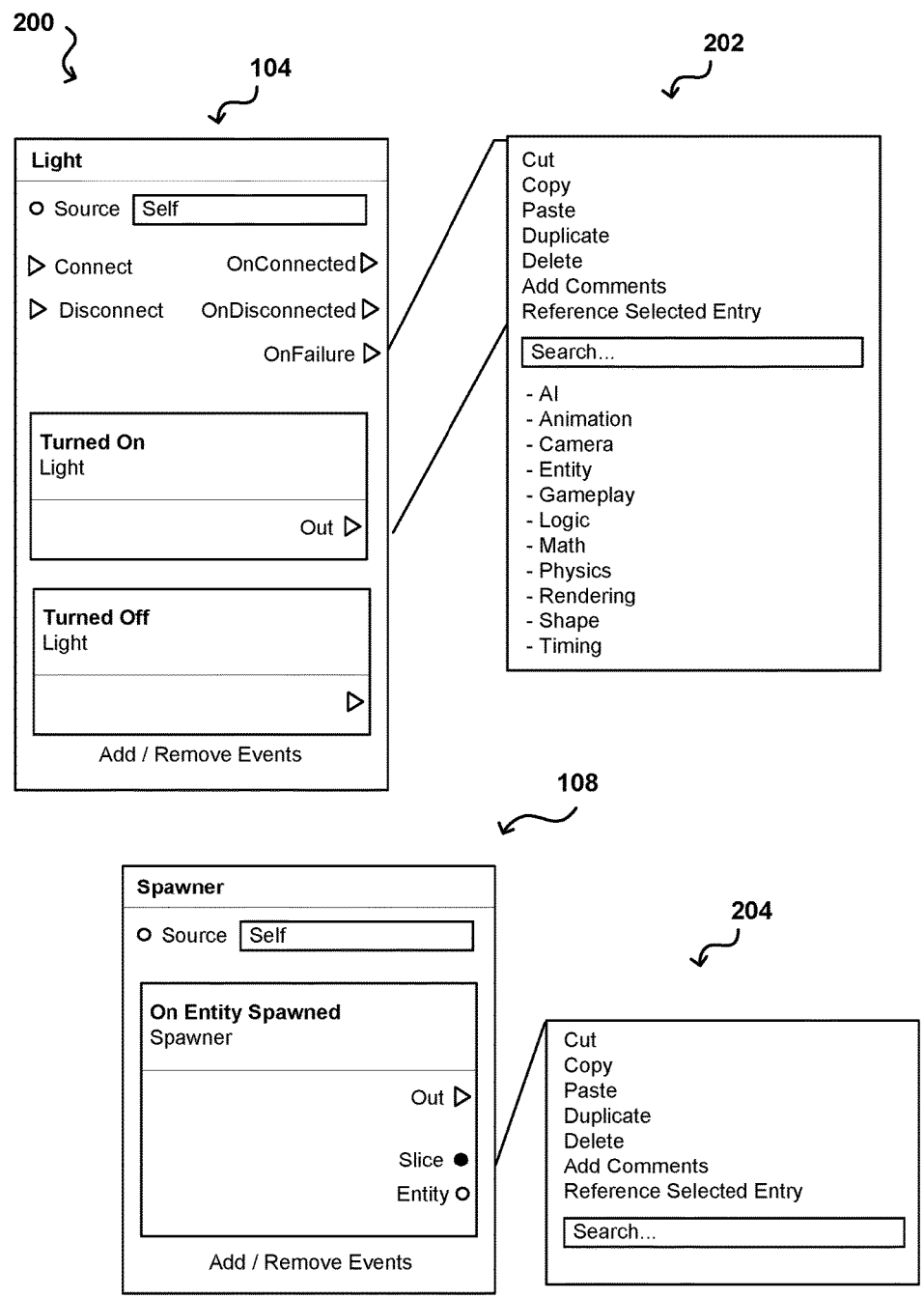
FIG. 2 illustrate additional example nodes of a visual scripting language that can be generated in accordance with various embodiments.

In the example interface view 202 of FIG. 2, a user can select various other nodes, actions, or handlers for a specific detected event. For example, the light node 104 receiving an event message that the light is turned on can have a respective output generated, and the node itself can facilitate the relevant event to be generated. In this example, a list of potential events 202 is provided that can be called when the light function is determined to be active. The user can utilize this interface to select or search for specific events, as well as to browse among various categories or use other such approaches to locate the relevant events or actions. A similar set of options 204 can be provided for the spawn event node 108.

A developer can drag or otherwise add an event node to the visual scripting canvas. The light node 104 can correspond to a script that determines how to interact with lights in the environment. The lights have specific behavior that was authored in a language such as C++, and that have specific behaviors for which messages will be sent on the corresponding event bus. The light node can listen for on or active behavior, as well as off or inactive behavior. The events can be specified for the node, where the node can support any appropriate node that is specified or attached to the light node. The event can be added by dragging an event link to pin the output or event action to another node, and the visual scripting interface will generate the appropriate code to cause the relevant event to be generated and the second node to listen for the particular event messages. Additional events can be specified that are relevant to the light as well, which can then be appended to the node as well. As mentioned, a single node can support multiple events. As illustrated, the light node 104 has both a light turn on event and a light turn off event, each of which has its own set of pins that can be used to connect for specific scripting behaviors. In some embodiments the addition of a node to the visual scripting canvas can cause the node to auto-populate with default behaviors, which can then be modified or updated by the relevant developer. For example, the developer can use the suggestions or options 202, 204 to add, remove, or replace events that come from a respective event bus.

In some embodiments, the event handlers will require the user to specify at least one connection for handling the respective events. For example, a source field can be used to specify the entry point in the entry deployment system. The node can be used to specify specific connection criteria, however, as well as various disconnect criteria. In this way, the visual scripting node enables the developer to link the nodes to other entries, and to handle their behaviors. There may be multiple lights in a scene, and there might be an indication to listen to specific lights or types of lights, which can then generate respective actions or event message upon detection. A determined behavior context can be bound in at least some embodiments, in order to enable the code to be bound to the script for visual scripting for a large number of events. The entity spawned node 108 can manage actions to be taken any time a specific type of entity is detected to have been spawned according to an event message received over the respective event bus. Each event can provide information relevant to the event. For an entity spawned event, the event can provide information as to the relevant slice and the corresponding entity that was spawns. There can then be multiple events defined to trigger for the relevant detection. Such an approach enables the visual scripting system to take advantage of the event bus messaging system without needed to understand or be familiar with the complexity of the event bus messaging system. The visual scripting node enables the behavior context of the event bus system to be leveraged when configuring the various event behaviors.

Various embodiments can rely on the behavior context of the event bus system to manage the nodes of the visual scripting interface. The nodes can be bound by objects or C++ classes, for example, and properties and functions can be exposed that can be called from the various scripting nodes. Leveraging the event bus system enables the visual scripting platform to send and detect events on the appropriate event buses, where the events can have their own binding or behavior context separate from the binding of the general classes or methods.

Figure 3:
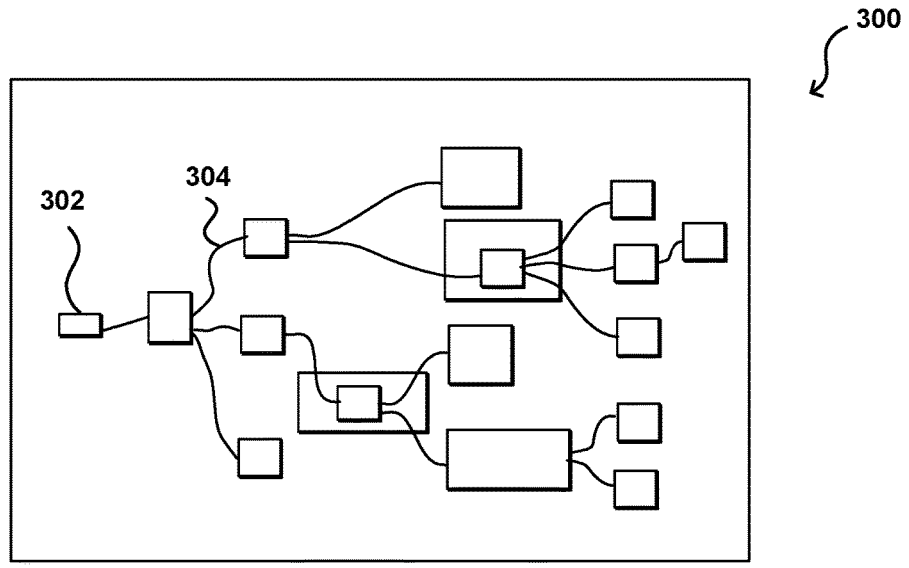
FIG. 3 illustrates an example node configuration of a visual scripting interface that can be utilized in accordance with various embodiments.

FIG. 3 illustrates an example node configuration 300 that can be generated using an example visual scripting interface in accordance with various embodiments. As illustrated, there can be various nodes 302 of different types added to the interface. This may correspond to a particular scene or level in the game, for example, where a parent node may represent the scene or level and other nodes in the interface represent the objects, actions, and functionality for the scene. The nodes can be connected using links 304 to indicate not only the relationship in the level tree, for example, but also which objects can have an impact on other objects, or can provide input to other nodes. Each node can have, for example, a name, a type, a set of inputs, a set of outputs, and a type of action or functionality to be executed, among other such options. As with various visual development languages, a developer can select or add nodes to the level and specify settings on these nodes to determine their functionality and interactions.

A developer can use the visual scripting language to perform the scripting for all gameplay for a gaming application. The system can be any appropriate visual scripting system, such as the Blueprints visual scripting system in the Unreal Engine, among other such options. In such a visual scripting system, each gameplay element can be represented by a node such as those illustrated in FIG. 3. The interface can also include other types of nodes or gameplay elements that can be linked together, using "wires" or other visible or virtual connections, as may include variables, functions, events, and the like. The linking of the various types of elements in a graph for a level can be used to generate relatively complex gameplay elements. The configuration and linking of nodes can enable a developer to quickly perform tasks such as to insert characters, establish game rules, and configure the movements of a virtual camera, among others. When adding characters, developers can specify content to use for rendering the characters, or other objects, as may include various models, textures, meshes and the like. The characters may also be linked to objects they carry or wear, as well as nodes for special skills or abilities available to the characters, etc. In the example node graph of FIG. 3A, the execution for a level may occur along the wires from left to right, although other configurations and execution approaches can be used as well in accordance with various embodiments. The execution flow can be monitored through the interface during game execution, which can assist with debugging and additional development.

Figure 4:
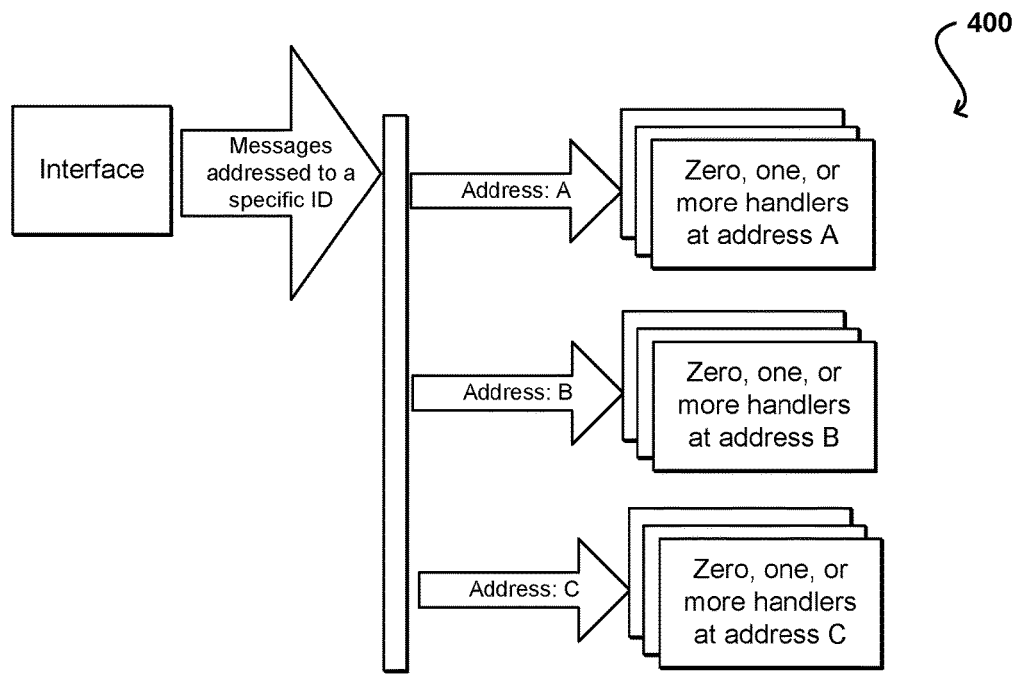
FIG. 4 illustrates an example message flow that can be utilized in accordance with various embodiments.

FIG. 4 illustrates an example event bus configuration 400 that can be utilized in accordance with various embodiments. An event bus can be configured for various usage patterns, from a single hander case to a case where the bus has many different addresses and handlers, among others. A basic configuration would include a many-to-one communication bus, where there is at most one handler, to which any sender can dispatch events. Senders need not manually check and de-reference pointers, as an event can be ignored if no handler is connected to the bus. Another common configuration would involve several handlers. This configuration can be used to, for example, implement observer patterns, subscriptions to system events, or general-purpose broadcasting. Events to the handlers can be received in defined or undefined order, which can be specified in a handler policy trait.

Event buses can also support addressing based on, for example, customer identifiers. Events addressed to an identifier are received by handlers connected to that identifier in at least some embodiments. If an event is broadcast without an identifier, the event can be received by handlers at all addresses. One use for this approach is for communication among the components of a single entity, or between components of a separate but related entity. In this case the entity identifier can be the address.

Event buses can also handle addresses and multiple handlers. The restriction of a single handler per address can be desirable to enforce ownership of an event bus for a specific identifier. However, if it is desired to have more than one handler per address, the event bus can be configured accordingly. Messages broadcast with an identifier might arrive at each address in no particular order, where the order in which the handlers receive the message is defined by a handler policy by identifier, for example. IF the messages arrive at each address in a specified order, the order in which the handlers receive the message can be defined by an order policy, among other such options. In the example approach 400 of FIG. 4, messages address to a specific identifier (ID) are received to a specified interface, and then directed to the relevant address(es). There can then be one or more handlers for each address, which can handle the received event messages for that address.

An example event bus can support both synchronous and asynchronous (queued) messaging. Synchronous messages can be sent to any and all handlers when an event bus event is invoked. Synchronous messages may limit opportunities for asynchronous programming, but they offer various benefits, in that they do not require storing a closure as arguments are forwarded directly to callers. Synchronous messages enable retrieving of an immediate result from a handler (event return value) with virtually no latency. Asynchronous messages have other advantages, however, as they can create many more opportunities for parallelism and are more future proof, and can support queuing messages from any thread, dispatching them on a safe thread (such as the main thread, or any thread that is chosen). The code used to write asynchronous messages them is inherently tolerant to latency and is easily migrated to actor models and other distributed platforms. The performance of the code that initiates events doesn't rely on the efficiency of the code that handles the events, and in performance-critical code, asynchronous messages can improve i-cache and d-cache performance because they require fewer virtual function calls.

Event buses contain other features that address various patterns and use cases. For example, a pointer can be cached to which messages can be dispatched. Such an approach can be beneficial for event buses that have identifiers. Instead of looking up the event bus address by identifier for each event, the cached pointer can be used for faster dispatching. Further, any callable function on an event bus can be queued as well. When using queued messaging, a bound function can be queued against an event bus for execution on another thread. This can be useful for general purpose thread-safe queuing.

Figure 5:
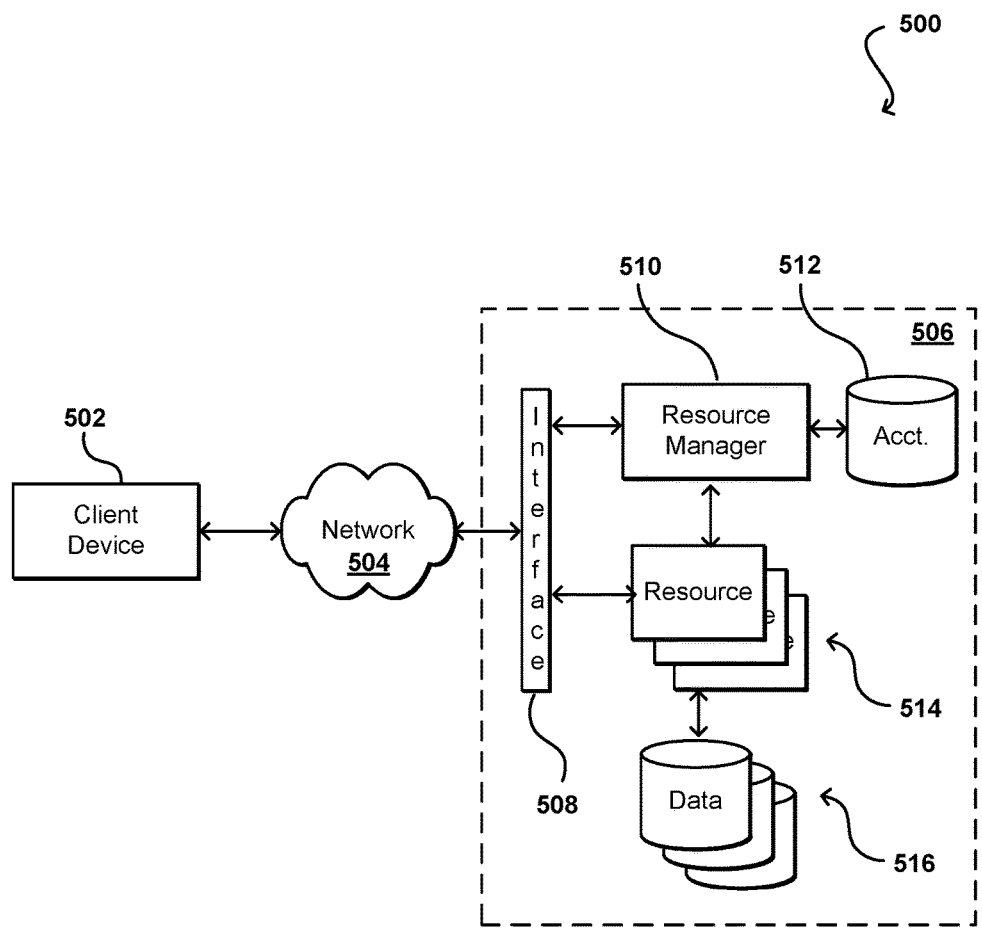
FIG. 5 illustrates an example environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
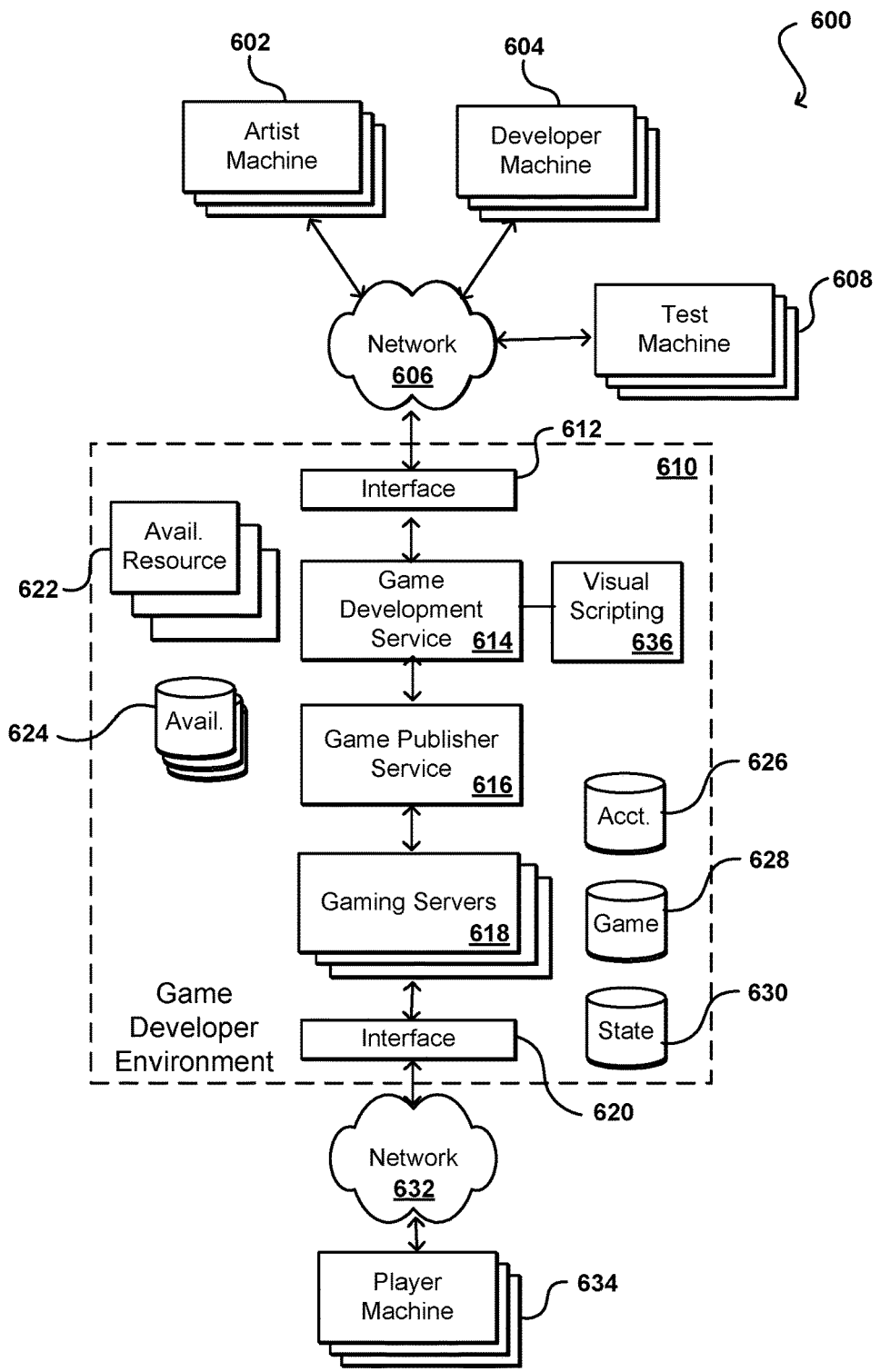
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in the resource environment 610 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can utilize a visual scripting service 636 as discussed herein, where the scripting interface can be rendered on the appropriate artist or developer machine, and the input used by the game development service 614 to generate the relevant script or code for the gaming application. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

Figure 7:
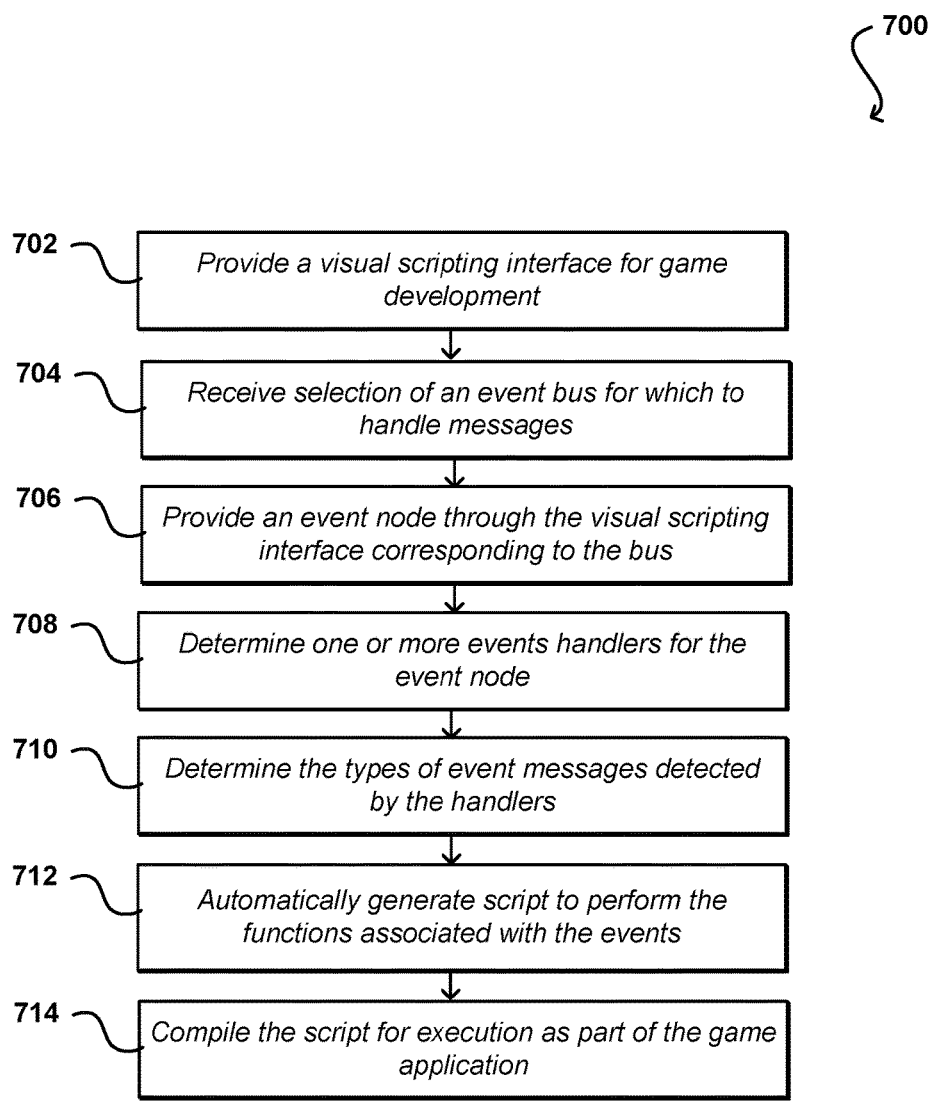
FIG. 7 illustrates an example process for managing event-driven message streams through a visual scripting interface that can be utilized in accordance with various embodiments.

FIG. 7 illustrates an example process 700 for managing events on an event bus stream using an event node of a visual scripting interface that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a visual scripting interface is provided 702 for development of an application, such as a game application. The interface can be part of a dedicated visual scripting service or offered as part of a game development pipeline, among other such options. As mentioned, the interface may correspond to a level or stage of a game that can have a start or parent node and various other game nodes connected using wires or other mechanisms as known for such purposes. During development, a selection of an event bus can be received 704 for which messages are to be handled for the game. As mentioned, an event node can be generated in response to an event bus selection, or an event bus can be specified for a newly created event node, among other such options. Either way, an event node can be provided 706 through the visual scripting interface that corresponds to the event bus. The default settings or options for the event node can be determined based at least in part upon a behavior context of the selected event bus. Based at least in part upon the type of event messages transmitted on the bus and the behavior context, one or more event handlers can be determined 708 for the event node. As mentioned, there can be various types of messages transmitted on the event bus, and an event handler can be configured to listen to messages of specific types, with specific content, from a specific source, or to a specific address, among other such options. A developer or other authorized entity can select from the available handlers, and update the configuration accordingly.

The types of events detected by the selected handers can be determined 710. As mentioned, there can be more than one action taken for each event type, or multiple actions triggered in response to a specific type of event. The handlers can have default settings based at least in part upon the types of events and the behavior context, and a user can modify at least some of the settings in various embodiments. Once the handlers are configured, and any dependencies or connections to other nodes are defined, the script for the node to perform those functions can be automatically generated 712, and associated with the event node and event bus. Once the game application is to an appropriate state, or another such criterion is met, the script can be compiled 714 for execution as part of the game application.

Figure 8:
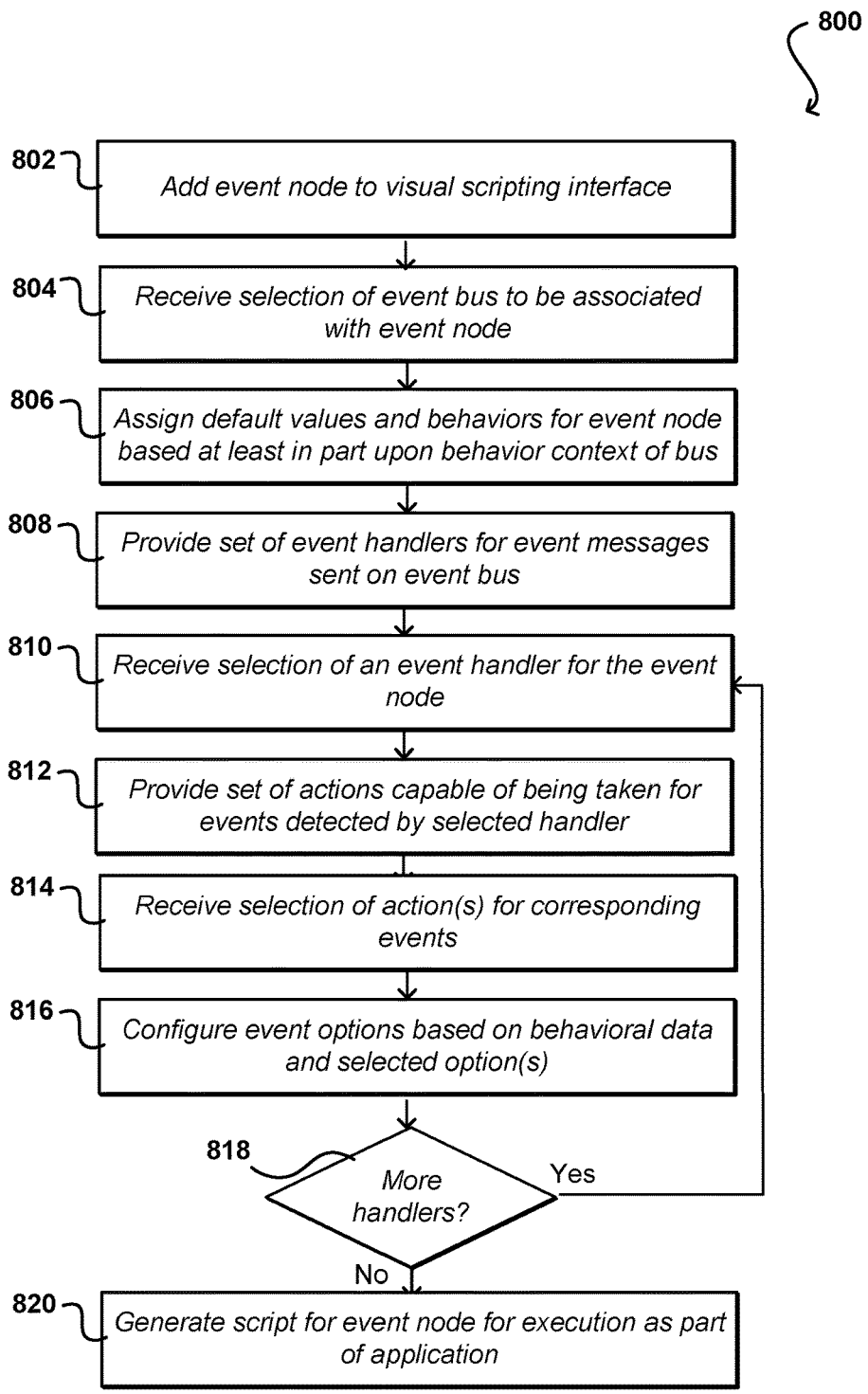
FIG. 8 illustrates an example process for configuring an event node that can be utilized in accordance with various embodiments.

FIG. 8 illustrates an example process 800 for configuring an event node, such as that discussed with respect to the process or FIG. 7, that can be utilized in accordance with various embodiments. In this example, an event node is added 802 to a visual scripting interface. This can be performed in response to a user selection or an action taken with respect to another visual scripting node, among other such options. A selection of a corresponding event bus can be received 804 that is to be associated with the node. As mentioned, each event bus can have a corresponding behavior context for messages sent by the bus. Accordingly, various default behaviors and values for the event node can be assigned 806 or determined based at least in part upon the behavior context for the bus. A set of event handlers can be provided 808 that can listen for messages of the types sent on the event bus, and that comply with the behavior context. A selection can be received 810 of one of the event handlers for the event node, which enables that event node to take action in response to messages being sent on the event bus for a specific type of event. A list or set of actions for that type of event message, capable of being detected by the selected event handler, can be provided 812 that can perform various actions for the corresponding types of events. A selection of one or more event actions can be received 814 for the selected event handler. Various options for the event can then be configured 816 based at least in part upon the relevant behavior data. If it is determined 818 that there are additional event handlers to be added or configured for additional event types, the process can continue. Otherwise, the script for the event node can be generated 820 by the system to enable the associated behavior during execution and gameplay of the associated gaming application.

Figure 9:
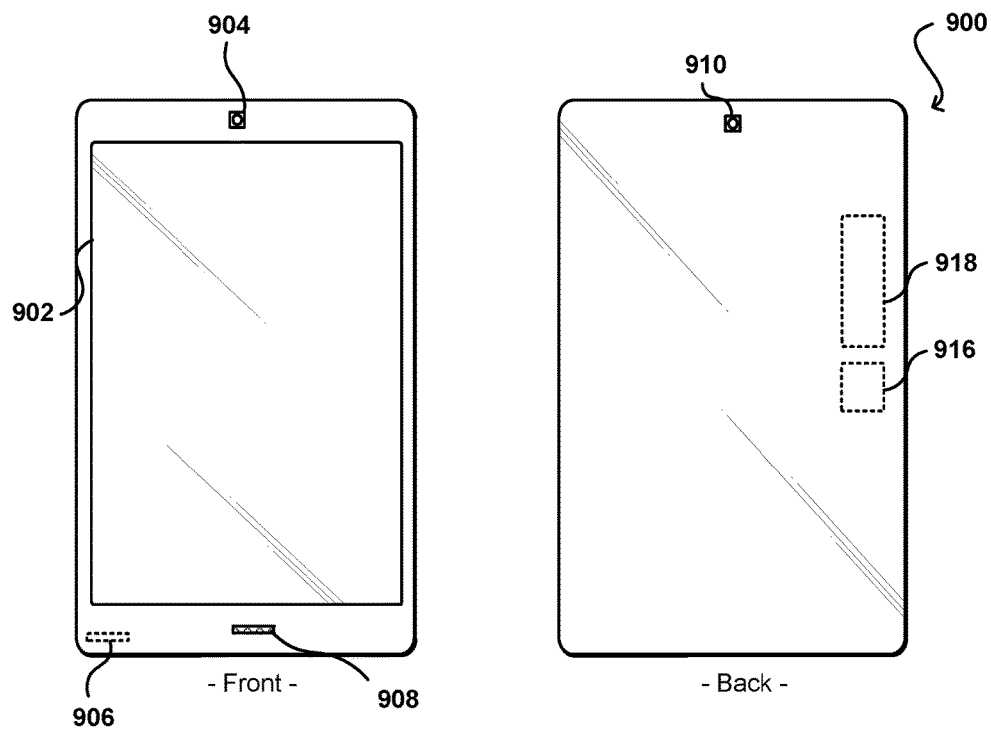
FIG. 9 illustrates an example computing device that can execute a gaming application in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display screen of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 908 on the front side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 906, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
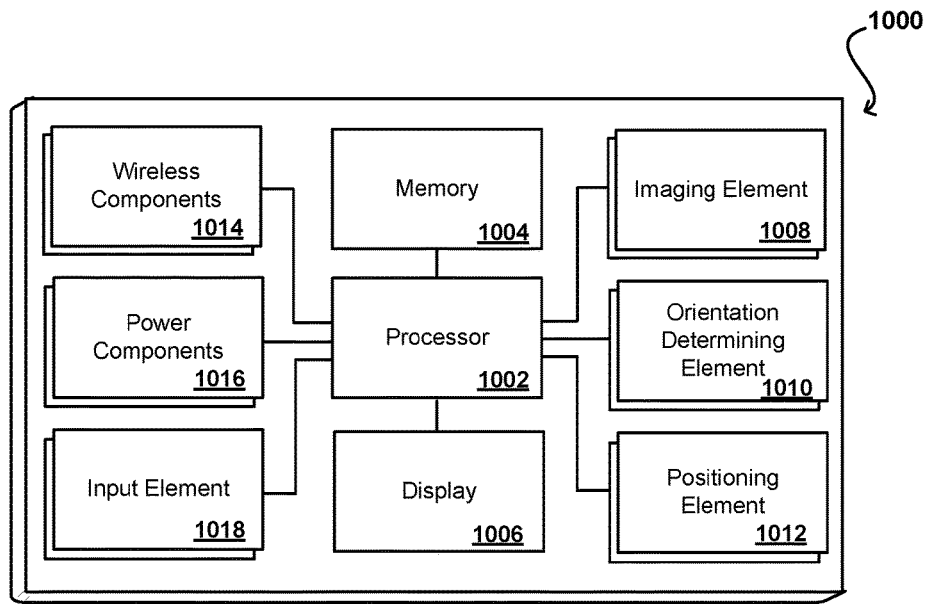
FIG. 10 illustrates example components of a computing device that can be used to implement aspects of the various embodiments.

FIG. 10 illustrates a set of basic components of an electronic computing device 1000 such as the device 1000 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, through a visual scripting interface, selection of an event bus, the event bus configured to transmit messages relating to occurrence of one or more event types during execution of a gaming application;
   causing a visual scripting node, corresponding to the event bus, to be displayed via the visual scripting interface;
   receiving, through the visual scripting interface, selection of at least one event type for the event bus;
   causing at least one event handler to be configured for the visual scripting node to listen for messages, transmitted over the event bus, of the at least one event type;
   receiving, through the visual scripting interface, selection of at least one action to be taken, through the gaming application, in response to detecting a message of the at least one event type;
   causing event script to be generated for the at least one action, the event script corresponding to the respective event handler and configured to be executed in response to detecting the message of the at least one event type; and
   compiling the script generated for the visual scripting node for execution as part of the gaming application.

2. The computer-implemented method of claim 1, further comprising:
   determining a type of the at least one event handler based at least in part upon a behavior context specified for the event bus.

3. The computer-implemented method of claim 2, further comprising:
   setting default values for a set of node behaviors determined based at least in part upon the behavior context specified for the event bus.

4. The computer-implemented method of claim 1, wherein the respective event handler is configured to generate a message to be transmitted over the event bus to a connection corresponding to another node of the visual scripting interface.

5. The computer-implemented method of claim 1, further comprising:
   determining an event class including a set of properties for messages sent on the event bus, the properties including at least one of a number of addresses to be contained by the event bus, a number of handlers to be connected to each address, or a type of identifier to be used to address the bus; and
   causing an event message generated by the at least one event handler to inherit the properties of the event class.

6. A computer-implemented method, comprising:
   generating, through a visual scripting interface, an event node associated with a specified event-based message stream;
   determining at least one event handler to listen for messages of at least one message type transmitted on the event-based message stream;
   determining at least one action to be performed in response to detecting a message via the at least one event handler; and
   automatically generating, through a visual scripting system providing the visual scripting interface, application code for execution, the application code corresponding to the at least one action to be performed for events detected by the at least one event handler.

7. The computer-implemented method of claim 6, further comprising:
   determining a default configuration of the at least one event handler based at least in part upon a behavior context associated with the event-based message stream.

8. The computer-implemented method of claim 6, further comprising:
determining one or more types of event messages sent using the event-based message stream; and
determining a set of event handlers available for use with the event node based at least in part upon the one or more types of event messages, the at least one event handler being selected from the set.

9. The computer-implemented method of claim 6, further comprising:
determining an event class including a set of properties for event messages sent on the event-based message stream, the properties including at least one of a number of addresses to be contained by the stream, a number of handlers to be connected to each address, or a type of identifier to be used to address the stream; and
causing an event message generated by the at least one event handler to inherit the properties of the event class.

10. The computer-implemented method of claim 6, further comprising:
determining a set of actions capable of being performed for event messages received by the at least one event handler; and
determining the at least one action from the set of actions based at least in part upon behavior information.

11. The computer-implemented method of claim 6, wherein the visual scripting system supports a plurality of linkable nodes for generation of a gaming application, and further comprising:
enabling a subset of nodes to configure event-based communications using event messages sent on one or more event-based message streams.

12. The computer-implemented method of claim 6, further comprising:
determining the at least one event handler based at least in part upon at least one of an address for a transmitted event message, a call order, a queuing of the event message, or a requirement to return a value in response to receiving the event message.

13. The computer-implemented method of claim 6, further comprising:
broadcasting, over the event-based message stream, an event message to be processed by a plurality of event handlers.

14. The computer-implemented method of claim 6, further comprising:
allocating one or more event handlers to each of a plurality of addresses for an event stream identifier.

15. A system, comprising:
at least one processor; and
memory including instructions that, when executed by the at least one processor, cause the system to:
generate, through a visual scripting interface, an event node associated with a specified event-based message stream;
determine at least one event handler to listen for messages of at least one message type transmitted on the event-based message stream;
determine at least one action to be performed in response to detecting a message via the at least one event handler; and
automatically generate, through a visual scripting system providing the visual scripting interface, application code for execution, the application code corresponding to the at least one action to be performed for events detected by the at least one event handler.

16. The system of claim 15, wherein the instructions when executed further cause the system to:
determine a default configuration of the at least one event handler based at least in part upon a behavior context associated with the event-based message stream.

17. The system of claim 15, wherein the instructions when executed further cause the system to:
determine one or more types of event messages sent using the event-based message stream; and
determine a set of event handlers available for use with the event node based at least in part upon the one or more types of event messages, the at least one event handler being selected from the set.

18. The system of claim 15, wherein the instructions when executed further cause the system to:
determine an event class including a set of properties for event messages sent on the event-based message stream, the properties including at least one of a number of addresses to be contained by the stream, a number of handlers to be connected to each address, or a type of identifier to be used to address the stream; and
cause an event message generated by the at least one event handler to inherit the properties of the event class.

19. The system of claim 15, wherein the instructions when executed further cause the system to:
determine a set of actions capable of being performed for event messages received by the at least one event handler; and
determine the at least one action from the set of actions based at least in part upon behavior information.

20. The system of claim 15, wherein the instructions when executed further cause the system to:
determine the at least one event handler based at least in part upon at least one of an address for a transmitted event message, a call order, a queuing of the event message, or a requirement to return a value in response to receiving the event message.

* * * * *